(12) United States Patent
Pacione et al.

(10) Patent No.: US 7,879,168 B2
(45) Date of Patent: Feb. 1, 2011

(54) ULTRASONIC WELDING OF RESILIENT LAYERS TO PLATES

(75) Inventors: Joseph Rocco Pacione, Newmarket (CA); John Anthony Pacione, Newmarket (CA); Franz Rittmannsberger, Richmond Hill (CA); Jurgen Hohenbichler, Judenberg (AT)

(73) Assignee: Tac-Fast Georgia L.L.C., Atlanta, GA (US)

( * ) Notice: Subject to any disclaimer, the term of this patent is extended or adjusted under 35 U.S.C. 154(b) by 1122 days.

(21) Appl. No.: 10/543,906

(22) PCT Filed: Jan. 29, 2004

(86) PCT No.: PCT/CA2004/000115

§ 371 (c)(1),
(2), (4) Date: Sep. 30, 2005

(87) PCT Pub. No.: WO2004/067217

PCT Pub. Date: Aug. 12, 2004

(65) Prior Publication Data

US 2006/0054268 A1    Mar. 16, 2006

Related U.S. Application Data

(60) Provisional application No. 60/443,565, filed on Jan. 30, 2003.

(51) Int. Cl.
*B32B 37/00* (2006.01)
(52) U.S. Cl. .......................... 156/73.1; 156/64; 52/403.1
(58) Field of Classification Search ................... 156/64, 156/73.1, 73.5, 580.1, 580.2; 52/403.1
See application file for complete search history.

(56) References Cited

U.S. PATENT DOCUMENTS

| 3,563,822 | A | * | 2/1971 | Fesh .......................... 156/73.1 |
| 4,514,242 | A | * | 4/1985 | MacLaughlin et al. ..... 156/73.5 |
| 5,026,445 | A | * | 6/1991 | Mainolfi et al. ............ 156/73.5 |
| 5,052,158 | A | * | 10/1991 | D'Luzansky .................. 52/177 |
| 5,204,155 | A | * | 4/1993 | Bell et al. ...................... 428/95 |
| 5,691,027 | A | * | 11/1997 | Eckhardt et al. ............ 428/100 |
| 5,750,227 | A |   | 5/1998 | Adams |
| 5,772,814 | A | * | 6/1998 | Grewell ........................ 156/64 |
| 6,306,477 | B1 | * | 10/2001 | Pacione ........................ 428/62 |

FOREIGN PATENT DOCUMENTS

| EP | 0 455 926 | | 11/1991 |
| JP | S49-30420 | | 8/1974 |
| JP | S52-49519 | | 4/1977 |
| JP | 10-216962 | * | 8/1998 |
| JP | 10216962 | | 8/1998 |
| WO | WO 86/03164 | | 6/1986 |

\* cited by examiner

*Primary Examiner*—James Sells
(74) *Attorney, Agent, or Firm*—Brian W. Gray; Christopher N. Hunter

(57) ABSTRACT

This invention relates to methods for manufacturing plates bonded to resilient layers, wherein the plate is made of a polypropylene and the resilient layer is made of a polyethylene. Ultrasonic welding used to bond the resilient layer to the plate. In some embodiments, a thin film is applied to a layer of the resilient layer before ultrasonic welding. While the film layer may be located adjacent the plate when welding, the film layer may also be advantageously located on the opposite of the resilient layer from the plate when welding. The film may also be applied to both sides of the resilient layer.

27 Claims, 6 Drawing Sheets

29

ULTRASONIC WELDING OF RESILIENT LAYERS TO PLATES

This application is a national phase entry of PCT/CA2004/000115 filed Jan. 29, 2004 designating the United States, which claims priority from U.S. Patent Application No. 60/443,565 filed Jan. 30, 2003. All of these applications are incorporated herein by reference. International Patent Application No. PCT/CA2004/000115 was published in English under Article 21 of the Patent Cooperation Treaty under WO 2004/067217 on Aug. 12, 2004.

FIELD OF THE INVENTION

This invention relates to methods of bonding plates by ultrasonic welding to resilient layers for use in a flooring system.

BACKGROUND OF THE INVENTION

In previous applications, systems and apparatus for creating modular subfloors have been disclosed, such as U.S. Pat. Nos. 6,306,477, 6,298,624, 6,395,362 and U.S. application Ser. Nos. 09/617,229, 10/004,834, 10/013,688 all of which are incorporated herein by reference. These applications generally describe plastic plates with a field of hooks on one side. In some of these applications, it has been disclosed that it is often preferable to have a resilient layer attached to the side of the plates on the opposite side from the field of hooks.

Methods of attaching, for example, a resilient layer made of polyethylene foam to a plate made of polypropylene are not well known. For example, they may be attached by gluing or by casting the foam to the plate. Alternatively, a soldering-type gun or hot plate could be used, but undesirable destruction of the foam material could occur. The heat of the gun or hot plate could also cause the polypropylene plate to warp. It has been suggested that bonding a foam resilient layer made of a polyethylene to a polypropylene plate by ultrasonic welding would not provide a sufficient bond between the resilient layer and the plate to enable the resilient layer and plate to be used in a sub-floor.

In order to weld or otherwise bond polyethylene foam and a polypropylene plate, a welding of polypropylene and polyethylene is required. Attempting to bond these two different materials can lead to low quality welds. The first reason for this behaviour is that, because of the different chemical structures of the two materials, the materials tend not to chemically bond to each other. The second problem is related to the different thermophysical behaviour of the materials. Polyethylene melts at lower temperatures (having a melting point of about 120° C.) than polypropylene (having a melting point about 165° C.). Accordingly, when the polypropylene begins to melt, the polyethylene is typically already in a liquid state. The result is generally low welding joint strength.

Accordingly, there is a need for alternative methods for welding two different materials such as polyethylene and polypropylene for use on a flooring structure.

SUMMARY OF THE INVENTION

In accordance with a broad aspect of the present invention there is provided a method for bonding a polyethylene resilient layer to a polypropylene plate, having the steps of: placing the resilient layer adjacent the plate; pressing an ultrasonic welding probe into the resilient layer; activating the probe; holding the probe in place until the resilient layer melts sufficiently to adhere to the plate; and withdrawing the probe.

According to a second aspect of the present invention there is provided a method for bonding a polyethylene resilient layer to a polypropylene plate. The method includes the steps of: placing the resilient layer adjacent the plate; activating the probe; pressing an ultrasonic welding probe into the resilient layer, holding the probe in place until the resilient layer melts sufficiently to adhere to the plate; and withdrawing the probe.

According to a third aspect of the present invention there is provided a method for bonding a resilient layer to a plate. The method includes the steps of: placing a film on a first side of the resilient layer; positioning the resilient layer so that the film lies against the plate; pressing an ultrasonic welding probe into the resilient layer until the movement of the probe is inhibited by the plate; activating the probe; maintaining the probe in position long enough to melt a portion of the resilient layer around the probe; and withdrawing the probe.

According to a fourth aspect of the present invention there is provided a method for bonding a resilient layer with a first side and an opposite second side to a plate. The method includes placing a film on the first side of the resilient layer; positioning the resilient layer so the second side of the resilient layer lies against the plate; pressing an ultrasonic welding probe into the film and resilient layer until the movement of the probe is inhibited by the plate; and withdrawing the probe.

According to a fifth aspect of the present invention there is provided a method for bonding a resilient layer with a first side and an opposite second side to a plate. The method includes placing a first film on the first side of the resilient layer; placing a second film on the second side of the resilient layer; positioning the resilient layer so the first film lies against the plate; pressing an ultrasonic welding probe into the second film, then into the resilient layer and then into the first film until the movement of the probe is inhibited by the plate; and withdrawing the probe.

According to a sixth aspect of the present invention there is provided an anchor sheet for use in a modular subfloor. The anchor sheet has a polypropylene plate and a polyethylene resilient layer. The resilient layer is ultrasonically welded to the plate by placing the resilient layer adjacent the plate and pressing an ultrasonic welding probe into the resilient layer. The probe is then activated and then held in place until the resilient layer melts sufficiently to adhere to the plate. The probe is then withdrawn.

According to a seventh aspect of the present invention there is provided an anchor sheet with a first and second surface. The sheet is made of a polypropylene and has a thickness of between 0.031 inches and 0.75 inches. The first surface bears hooks, and a resilient layer is ultrasonically welded to the second surface.

According to an eighth aspect of the present invention there is provided a method for bonding a polyethylene resilient layer to a polypropylene plate using a laser. The method includes the steps of placing a laser-meltable film on a surface of the resilient layer; holding the resilient layer against the plate with the film therebetween; activating the laser to emit a laser beam; focussing the laser beam to first pass through the plate and into the film until at least the film melts sufficiently to adhere to the plate and resilient layer; moving the laser beam to form a melt line between the plate and resilient layer; and deactivating the laser.

According to a ninth aspect of the present invention there is provided a method for bonding a resilient layer, a laser-meltable film, and a plate using a laser. The method includes the steps of holding the resilient layer against the plate with the film therebetween; activating the laser to emit a laser beam; focussing the laser beam to first pass through the plate and into the film until at least the film melts sufficiently to adhere to the plate and resilient layer; moving the laser beam to form a melt line between the plate and resilient layer; and deactivating the laser.

According to a tenth aspect of the present invention there is provided a method for bonding a laser-meltable resilient layer to a plate using a laser. The method includes the steps of holding the resilient layer against the plate; activating the laser to emit a laser beam; focussing the laser beam to pass through the plate and into the resilient layer until the resilient layer melts sufficiently to adhere to the plate; moving the laser beam to form a melt line between the plate and resilient layer; and deactivating the laser.

Other and further advantages and features of the invention will be apparent to those skilled in the art from the following detailed description of embodiments thereof, taken in conjunction with the accompanying drawings.

BRIEF DESCRIPTION OF THE DRAWINGS

The present invention will be further understood from the following detailed description of embodiments of the invention, with reference to the drawings in which.

DETAILED DESCRIPTION OF EXEMPLARY EMBODIMENTS

Figure 1:
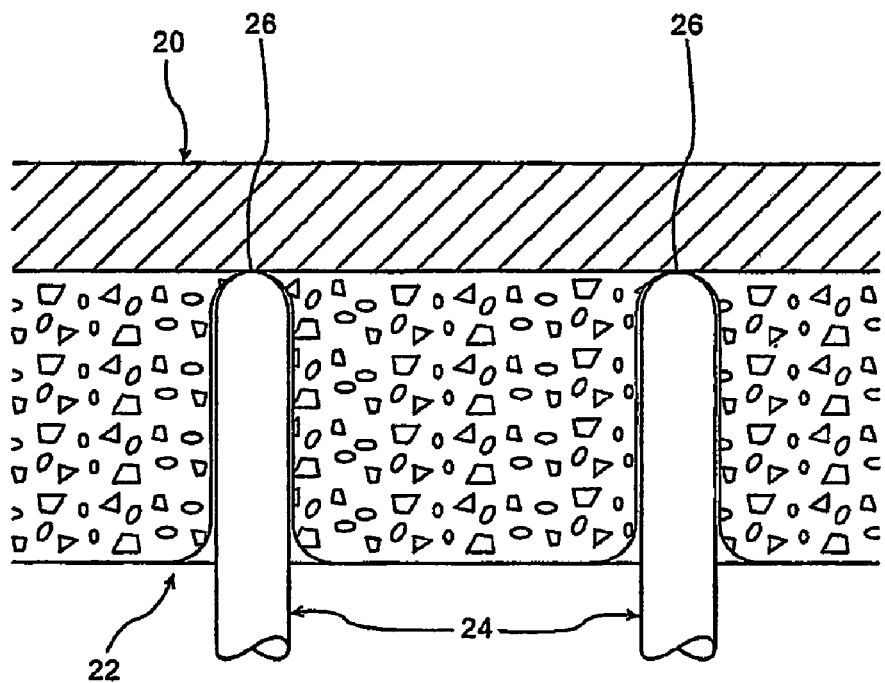
FIG. 1 is a side section view of a plate and a resilient layer adjacent to one another to be ultrasonically welded.

Similar references are used in different figures to denote similar components. Referring to FIG. 1, a plate 20 and a resilient layer 22 are shown. Plate 20 is made from a polypropylene, or of some other appropriate material such as a polyethylene. Plate 20 preferably has a thickness of from 1/16 of an inch to 1/8 of an inch. Resilient layer 22 is made from low density polyethylene that has a density of approximately 30 kg/m³. The resilient layer has a thickness of from 1/4 to 3/8 of an inch. Other densities and thicknesses may be used as appropriate.

Plate 20 and resilient layer 22 are placed adjacent one another to be attached to one another by ultrasonic welding. Ultrasonic welding is a generally fast, clean and reliable process that is well suited to mass production. It involves the use of high frequency mechanical sound energy which may be used to melt or otherwise join thermoplastic parts. Additional welding consumables are generally not required.

Ultrasonic welding appears to have improved effectiveness when a foam material is welded to a solid plate rather than when two solid plates are welded. Ultrasonic welding of a foam to a plate may be made possible due to the difference in the stiffness of the two materials. For example, if a high density polyethylene plate is welded to a polypropylene plate, the different welding points and the different coefficients of linear thermal expansion of the different materials can cause the creation of stresses during the cooling process. The stresses can ultimately exceed the strength of the weld. Alternatively, a foam bonded in this manner tends to experience a limited build up of such stresses. For example, the Youngs modulus of the foam used is only about three percent of the modulus of a polypropylene plate.

The pieces to be joined, such as plate 20 and resilient layer 22, are held together and subjected to ultrasonic vibrations, usually at a frequency of approximately between 20 and 60 kHz. Frequencies outside of this range may also be used. A variation in frequency affects the energy dissipation in the part. Vibration of the sonotrode serves to generate melt at the mating surfaces of the adjacent thermoplastic parts. After a pre-set time, the ultrasonic vibration is switched off, welding pressure is maintained, and the molten thermoplastic solidifies to form a weld. With weld times typically less than one second, the process is generally relatively fast.

Referring to FIG. 1, an ultrasonic welding probe such as a horn or sonotrode 24 vibrates and is pressed into resilient layer 22 towards plate 20, preferably until its movement toward plate 20 is inhibited by plate 20. This takes approximately one second, depending upon the arrangement of the pneumatic brake cylinder (not shown) activating sonotrode 24. As sonotrode 24 vibrates, it creates localized heat which, combined with the pressure of holding sonotrode 24 in place, forms a bond such as a weld between plate 20 and resilient layer 22 about location 26. Sonotrode 24 is preferably held in place for about two seconds.

The welding time is approximately 0.8 seconds. There is no real upper limit to the time that sonotrode 24 is held pressing into the resilient layer 22. Welding times of between 0.5 and 2 seconds have been found to be acceptable. However, welding times outside of this range are expected to be acceptable as well. The holding time generally consists of three stages:

1. Pressing sonotrode 24 into resilient layer 22 to build up pressure (approximately 0.5 seconds);
2. Supplying sonotrode 24 with ultrasonic energy to initiate a weld (approximately 0.8 seconds); and
3. Resting to fix the weld and to cool the materials (approximately 1.0 second).

The time to move sonotrode 24 away from resilient layer 22 is about 0.5 seconds. This is also dependent on the set-up for actuating sonotrode 24. For example, sonotrode 24 may be actuated mechanically, electrically, hydraulically, or in some other manner to position the sonotrode as described above.

Figure 9:
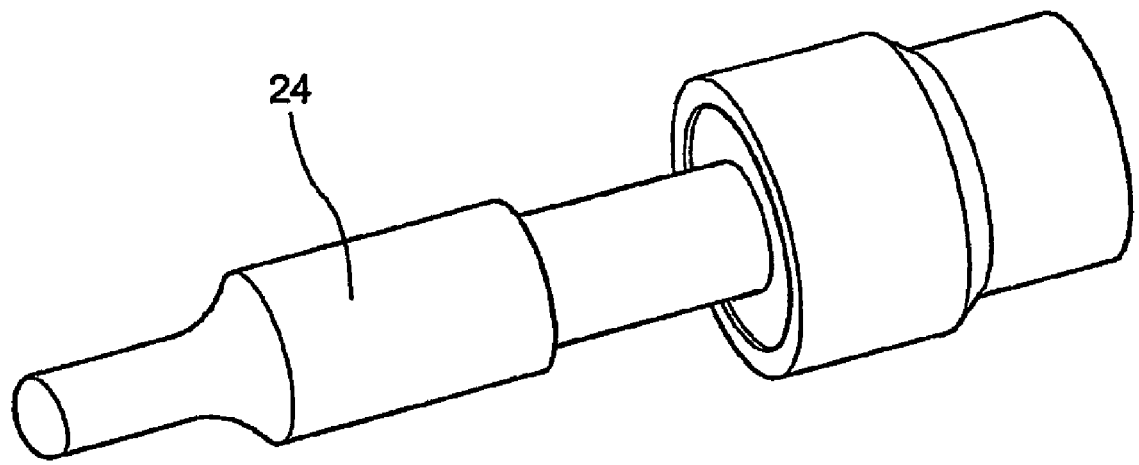
FIG. 9 is a perspective view of a sonotrode.
Figure 10:
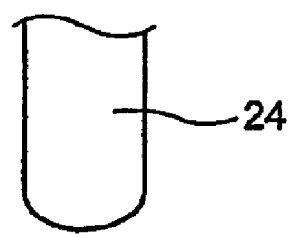
FIG. 10 is a schematic side view of a sonotrode.

The end of sonotrode 24 is preferably generally rounded, having a preferred end radius of 8 mm merged into a radius of 3 mm, as shown in FIGS. 9 and 10. While other shapes may be used, a rounded end has been found to provide an adequate bond as compared to, for example, flattened cylindrical ends. The length of sonotrode 24 is about 100 mm and its diameter is about 11.5 mm (though these dimensions are not essential). The material used to manufacture sonotrode 24 is preferably a titanium alloy. Aluminium may also be used. Sonotrodes having the above characteristics may be obtained from Telsonic GmbH of Nuremberg, Germany.

Additional sonotrodes 24 may be applied, either simultaneously or in succession, to form additional weld locations 26.

It has been found that by this method, a polyethylene foam resilient layer 22 and a polypropylene plate 20 can be ultrasonically welded in a commercial fashion to exhibit a commercially acceptable rip off force for the purposes of attaching a polyethylene foam layer to a polypropylene plate for use as an anchor sheet as described in: U.S. Pat. Nos. 6,306,477, 6,298,624, and 6,395,362; U.S. application Ser. Nos. 09/617,229, 10/004,834, and 10/013,688; and patent applications entitled "Improved Anchor Sheet" and "System and Methods of Manufacturing Hook Plates" filed on even date herewith; the teachings and specifications of which are incorporated herein by reference.

Figure 2:
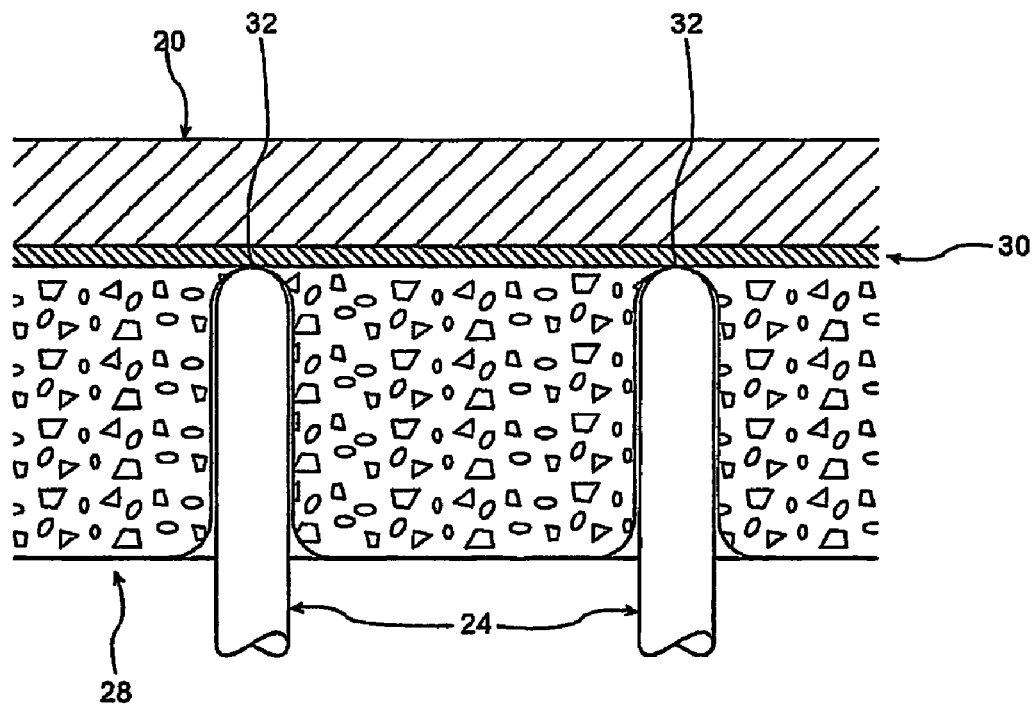
FIG. 2 is a side section view of a plate and a resilient layer with a film layer facing the plate.

FIG. 2 illustrates an alternative embodiment of the invention. In this embodiment, a thin plastic film 30 (as described later) is bonded to one side of resilient layer 22 before welding. Films in at least the range of 0.3 mils to 8 mils have been found to be acceptable. The film may be bonded by co-extruding the laminating film 30 to the resilient layer 28, by adhesive, by casting in place, or by any known method. Resilient layer 28 has thin plastic film 30 bonded to one side thereof.

Plate 20 and thin plastic film 30 are placed adjacent to one another. Sonotrode 24 vibrates and is pressed into resilient layer 28 and against thin plastic film 30 and plate 20, creating localized heat and pressure to create welds about locations 32. Sonotrode 24 is preferably pressed into resilient layer 28 in a direction generally perpendicular to the planes of resilient layer 28 and plate 20 until its movement is inhibited by plate 20.

The holding time for sonotrode 24 will generally increase as thicker film is used, and if a thicker resilient layer 22 is used. The total holding time will generally be maintained in a range of between one and ten seconds, though even slower times may be used.

As discussed below in relation to FIG. 5, when film 30 is positioned against plate 20 and welded, a generally improved performance is observed in a rip off force test. As discussed further below, performance depends, in part, upon the thickness of the film 30.

Resilient layer 28 is preferably made from low density polyethylene, having a density of approximately 30 kg/m$^3$, and being ¼ to ⅜ of an inch thick. Other densities and thicknesses may be used as appropriate.

The welding characteristics of the method illustrated in FIG. 2, i.e., with the film attached to the resilient layer, as compared to the method of FIG. 1, permits the use of resilient layers that are generally more difficult to weld to plate 20. For example, the resilient layer 28 may be made from a polyurethane foam, a rubber foam, a polyethylene foam, a silicone foam, a polypropylene foam, a polystyrene or a thermoset foam.

Thin plastic film 30 is preferably a polyethylene plastic film. Film 30 will usually be the same material as resilient layer 22, but it does not have to be. Film 30 might also be made from the same type of material as plate 20, or it might be made from a bonding material, such as a hot melt. Film 30 is preferably bonded to resilient layer 28 using an extrusion laminating process, or some other known process, when resilient layer 28 is manufactured.

Figure 3:
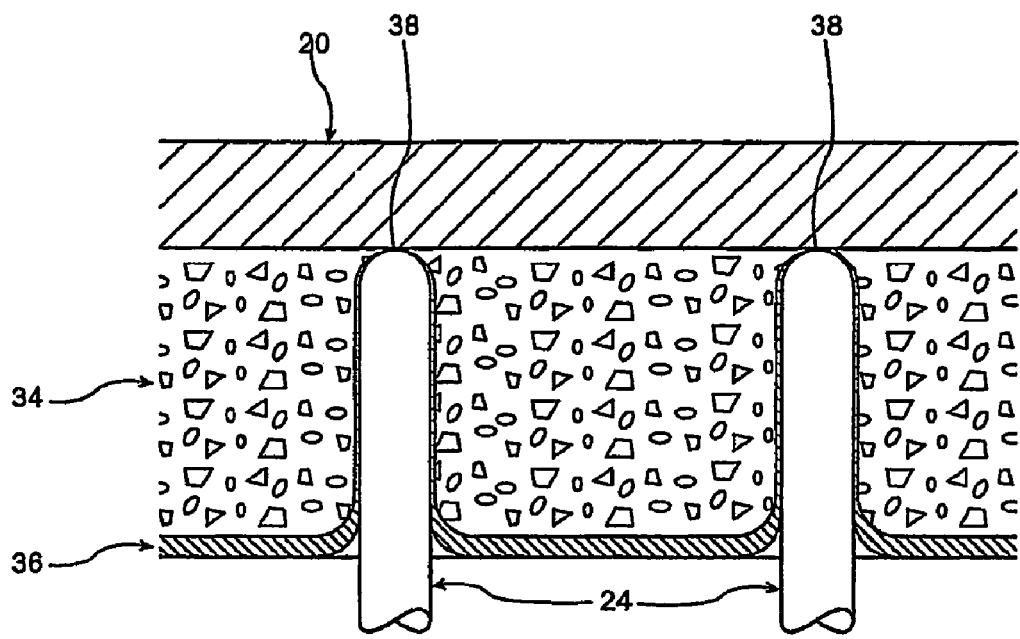
FIG. 3 is a side section view of a plate and a resilient layer with a film layer opposite the plate.
Figure 6:
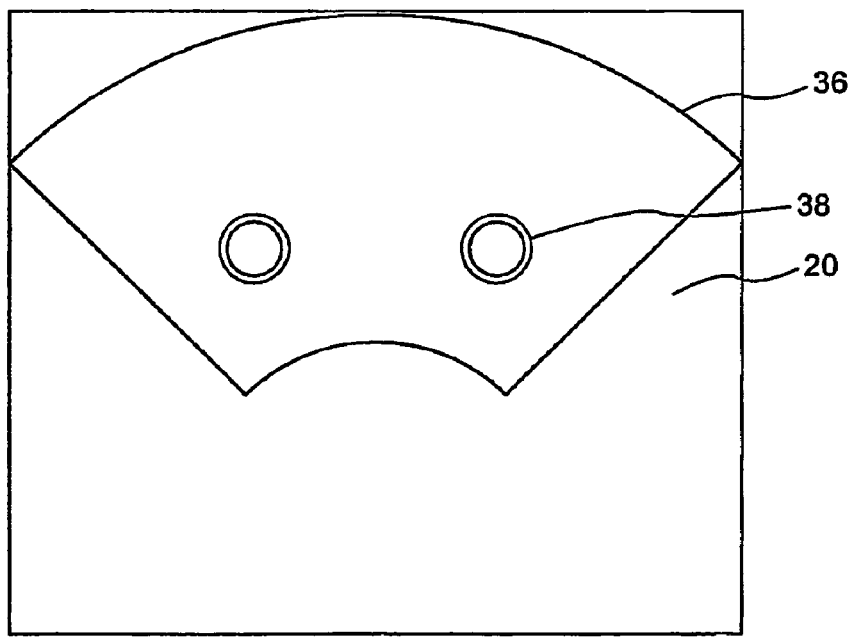
FIG. 6 is a top view of the plate and resilient layer of FIG. 3.

Referring to FIGS. 3 and 6, in a further alternative embodiment, a thin plastic film 36 may be bonded to a side of a resilient layer 34, and placed so that resilient layer 34 is between thin plastic film 36 and plate 20, before ultrasonic welding. Resilient layer 34 has a thin plastic film 36 bonded to one side thereof. Plate 20 and resilient layer 34 are placed together so that the thin plastic film 36 lies on the opposite side of resilient layer 34 from plate 20. Sonotrode 24 vibrates and is pressed into thin plastic film 36 and resilient layer 34. Sonotrode 24 is preferably pressed into resilient layer 34 until its movement is inhibited by plate 20, creating localized heat and pressure to form welds about locations 38.

Figure 11:
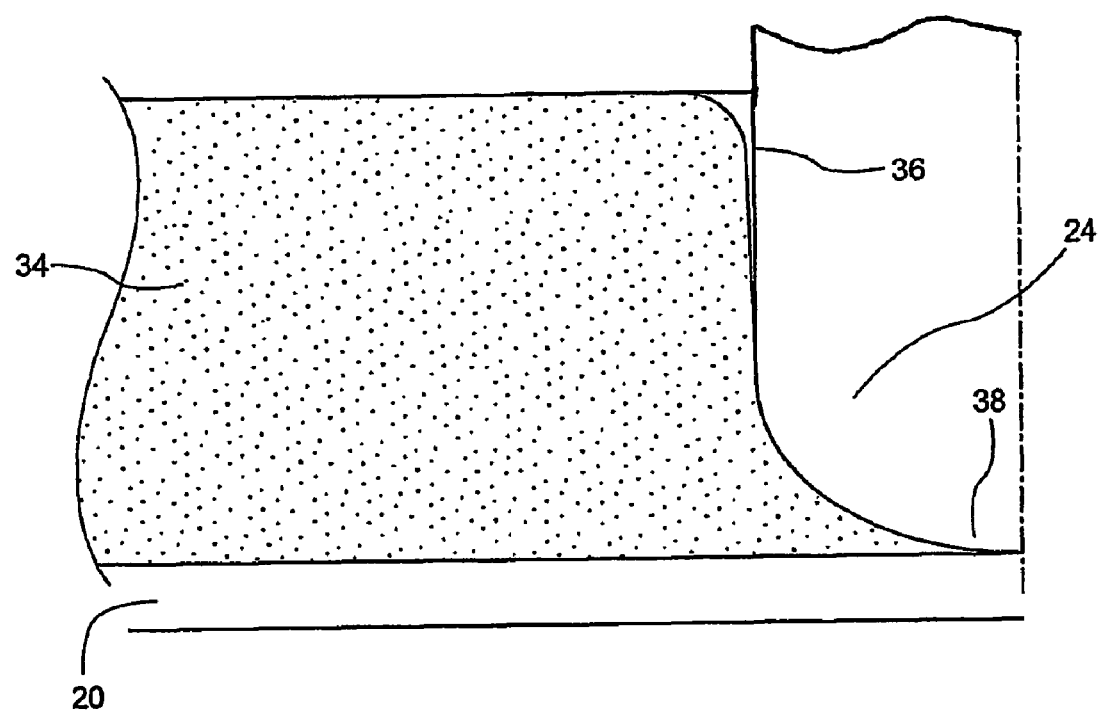
FIG. 11 is a partial cutaway view of a weld area.

Referring to FIG. 11, sonotrode 24 and the transition or weld area 38 is shown in detail. In weld area 38, resilient layer 34 is partially melted and compressed by sonotrode 24 (not shown in this figure). Film 36 on a side of resilient layer 34 can provide a generally improved weld strength compared to a resilient layers without a film. In the area where film 36 is deformed by sonotrode 24, the creation of an open cell surface structure is minimized. An open structure could be very weak. It will be noted from FIG. 11 that film 36 remains on the surface of resilient layer 34, even as sonotrode 24 is pressed into the resilient layer.

The use of film 36 positioned on a side of resilient layer 34 opposite to plate 20 when welding, creates different, generally improved performance in a rip off force test as compared to the arrangement in the embodiment and method of FIG. 1, where no film is used, and the embodiment and method of FIG. 2, where the film is on the side of the resilient layer opposite the plate. Accordingly, the method of FIG. 3 may also be used with resilient layers that are generally more difficult to weld to plate 20. As discussed below, actual performance depends in part upon the thickness of any applied film 36.

In a manner similar to the embodiment disclosed in FIG. 1, resilient layer 34 is preferably made from a low density polyethylene. The low density polyethylene may also have a density of approximately 30 kg/m$^3$, and it may be ¼ to ⅜ of an inch thick. Thin plastic film 36 is a polyethylene plastic film. Films in at least the range of 0.3 mils to 8 mils have been found to be acceptable. As for other embodiments, film 36 may be bonded to resilient layer 34 using an extrusion laminating process.

Figure 4:
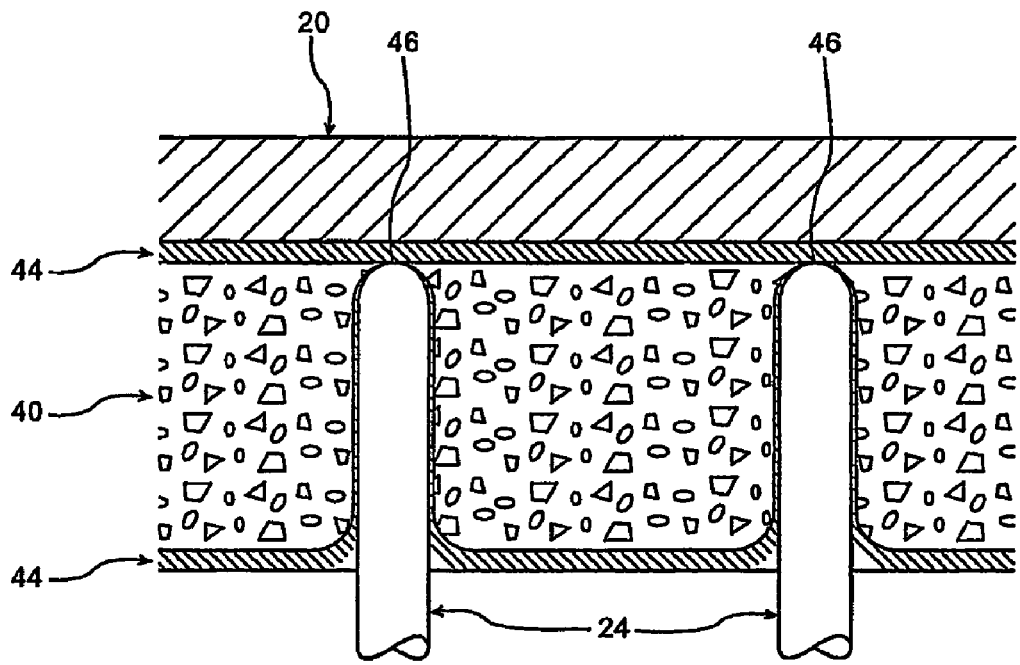
FIG. 4 is a side section view of a plate and a resilient layer with film layers on opposite sides of the resilient layer.

Referring to FIG. 4, in a further alternative embodiment, a thin plastic film 44 is bonded to both sides of a resilient layer, and placed so that one of the thin films lies against plate 20, just before ultrasonic welding. Resilient layer 40 has thin plastic films 42 and 44 bonded to opposite sides thereof. Plate 20 and resilient layer 40 are placed together so that thin plastic film 44 lies adjacent to plate 20. Sonotrodes 24 preferably vibrate at ultrasonic frequencies above 20 kHz. As noted, the higher the frequency, the higher the energy generated. Accordingly, the welding time generally decreases with an increase in the frequency. However, it is generally easier to create lower frequencies at high power. As sonotrodes 24 vibrate they are pressed into thin plastic film 42, resilient layer 40 and thin plastic film 44 until its movement is inhibited by plate 20, to create localized heat and pressure and to form welds about locations 46.

Resilient layer 40 is preferably made from low density polyethylene, having a density of approximately 30 kg/m$^3$, and being ¼ to ⅜ of an inch thick. Resilient layer 40 may alternatively be made from a polyurethane foam. It may also be made from a rubber foam.

Testing

Figure 5:
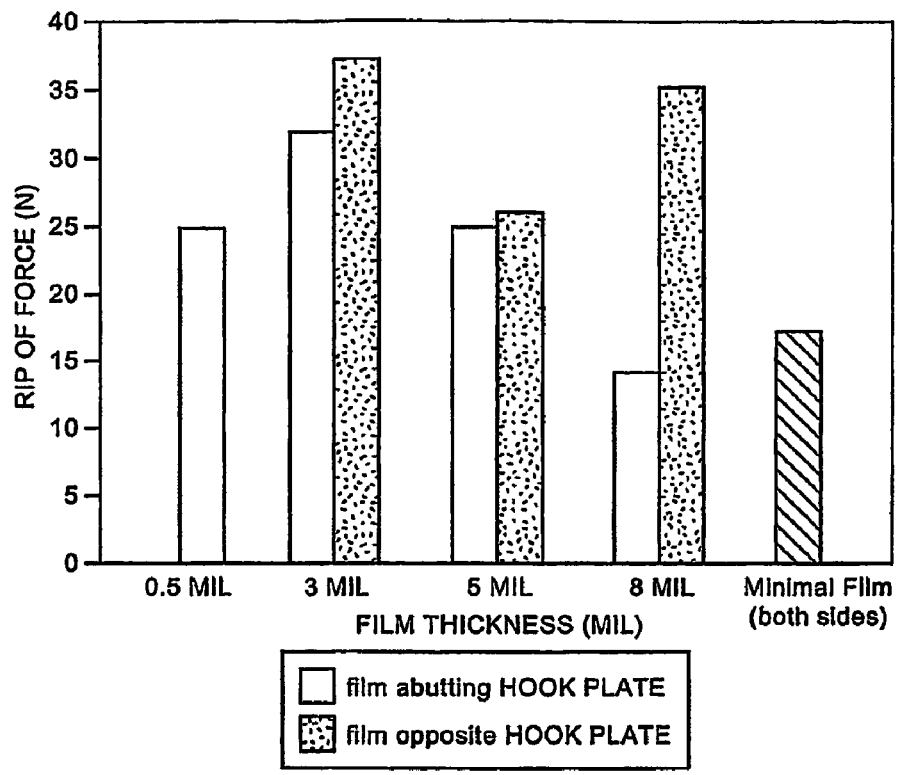
FIG. 5 is a graph charting the rip off force for resilient layers ultrasonically welded to plates in accordance with FIGS. 2, 4 and 6.

FIG. 5 is a graph charting results of rip off force tests performed on various welds of resilient layers to plates. In the following description, reference to the element "resilient layer", includes each of resilient layers 22, 28, 34, or 40, taken independently, unless noted otherwise.

Figure 7:
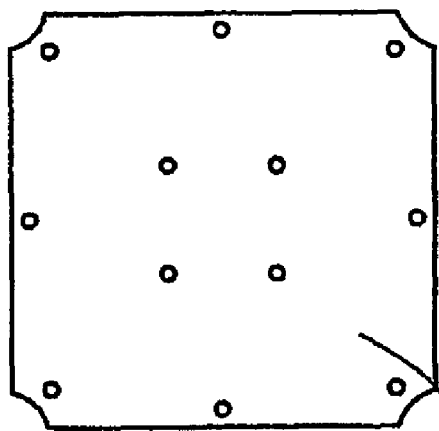
FIG. 7 is a top view of a plate having 12 weld locations.
Figure 8:
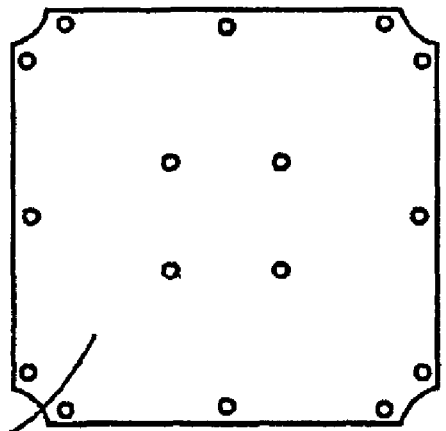
FIG. 8 is a top view of a plate having 16 weld locations.

The "rip-off test" measures the strength of the weld between resilient layer and plate 20. The resilient layer under evaluation is welded to plate 20 by hand. In the tests, plates 20 were made from a PP-Homopolymer, having a thickness of about 0.131 inches (not including the hooks). The resilient layers were all polyethylene LDPE foam with a density of approximately 27 kg/m$^3$ (specific gravity of 0.027), and having a thickness of about 0.39 inches. The plastic films were all low density polyethylene, and were bonded to the resilient layers by an extrusion laminating process. A Telsonic Handystar™ ultrasonic welding device having a titan alloy sonotrode was used. In all tests, sonotrode 24 was placed by hand vertically onto the resilient layer in a direction normal to the plane of the resilient layer. Both plate 20 and the resilient layer were supported by a stable horizontal surface. Sonotrode 24 was pressed into the resilient layer until sonotrode 24's movement toward plate 20 was inhibited by plate 20. Sonotrode 24 was then held in place for approximately 1.5 seconds. The precise welding pressure was not recorded because hand pressure was used. Each plate 20 used was a generally square sheet having 12 inch sides. Referring to FIGS. 7 and 8, sample parts were produced with 12 (see FIG. 7), 16 (see FIG. 12) and 20 (not shown) welding points 29 between the resilient layer and each respective plate 20.

For the rip-off test, the resilient layer was cut into generally rectangular-pieces (each about 15.75 square-inches). Two resilient layer pieces were welded to each plate 20 (one resilient layer with film 30 oil the side adjacent to plate 20, and one resilient layer with film 36 on the opposite surface). One welding point was used to weld each resilient layer to plate 20. The sonotrode 24 was pressed into resilient layer 22 towards plate 20 for about 1.5 seconds with a power of 500 Watts applied to the sonotrode 24.

Measuring was performed by inserting a stiff steel needle (not shown), having a small diameter, through the resilient layer of the welded part. The steel needle was inserted so that it was generally parallel to the plane of plate 20, and located at approximately the middle of the thickness of the resilient layer. The steel needle was then directed through the midpoint of the weld location. Next, a force was applied to the steel needle in a direction away from plate 20, and a spring scale was used to measure the applied force. The force was increased in a slow generally constant manner until the weld location separated from plate 20. The measured force was defined as a "rip-off force". Since breakage occurs at the weld location, the weld strength of the resilient layer and plate 20 is measured, and not the strength of the resilient layer or plate 20.

The results of a rip-off force test for a resilient layer welded to a plate without the use of a film bonded to the resilient layer (as described in connection with FIG. 2) are shown as the hatched column on the farthest right of FIG. 5 (marked "minimal film both sides"). In this configuration, approximately 16 Newtons of force was required to separate the bonded resilient layer and plate. This is considered to be an acceptable force for many of the installations of plates 20 described herein. However, a greater resistance to removal of an attached resilient layer 22 from plate 20 is preferred where one or more plates 20 are attached to an underlying substrate, such as a floor or wall, as opposed to being loose laid on a floor where the plate may have sufficient mass to prevent movement thereof.

The results of rip-off force tests for an approximately ⅜" thick resilient layer welded to a plate using a film bonded to the resilient layer and placed against the plate (as described in connection to FIG. 2) are shown as clear columns in FIG. 5 (marked "film abutting hook plate"). Results for films of 0.5 mil, 3 mil, 5 mil and 8 mil thicknesses are shown. The foam used for all embodiments having an added film (i.e., the 0.5, 3, 5, and 8 mil embodiments) is manufactured by OleTex Incorporated of South Holland, Ill.

As illustrated in the graph, these results are generally better than the results for no added film, although at the 8 mil thickness of the film, where the film is abutting the plate, the results of the rip off force test degrade below the results for no added film. It should be noted that the foam having a film of 0.5 mil, actually had a film of 0.5 mil on both sides thereof. The foams having 3, 5, and 8 mil films had the side of the foam opposite to the film skived (i.e., having a thin layer cut off) to ensure that there was no film on that side.

The results of rip-off force tests for a resilient layer welded to a plate using a film bonded to the resilient layer on one side where the resilient layer is placed against the plate on the opposite side (as generally described in connection with FIG. 3) are shown as black columns in FIG. 5 (marked "foam abutting hook plate"). Results for films of 3 mil, 5 mil and 8 mil thicknesses are shown. These results are all generally better than the results for "no added film", and are also generally better than or at least similar to the results for "film abutting hook plate" with a similar thickness of film. The term "no added film" is placed in quotes because the resilient material used in the test for the no film condition only, had a very thin film on both sides. The "film" in this case is a product of the foam manufacturing process, and is about an order of magnitude thinner than the films expressly described herein. The foam used for the "no added film" testing was NA-30 open cell polyethylene foam manufactured by ISOchemie GmbH of Germany.

It was found that the force required to remove the welded resilient layer from plate 20, could be increased by increasing the number of weld locations and/or increasing the area of the weld locations.

Although the tests graphed in FIG. 5 were run on films ranging from 0.5 mil to 8 mil in thickness, films of greater or lesser thicknesses may be advantageously used, depending upon the other parameters, including the method of welding used (the method of FIG. 2, the method of FIG. 3, or the method of FIG. 4), the materials used, the welding conditions and the thickness of the plate and resilient layers.

Laser Welding

Plates and resilient layers may alternatively be attached to one another using laser transmission welding. A laser system such as a laser-fiber coupling system, or some other laser welding arrangement, may be used. The subcomponents of such a system may include:

a laser cabinet with integrated power supply and closed loop water chiller;

a lens system;

a fiber coupling system;

an optical fiber; and a work area for welding.

For the welding of the resilient layer 22 and plate 20, a high-power diode carbon dioxide laser ("HPDL") is preferably used having a power of about 300 W and a frequency of about 940 nm+/−5 nm. A lens system with divergence and a focussing lens is used with a NA 0.22 optical fiber. The laser is focussed to pass through the polypropylene material and is applied with its full power of 300 W. It is a continuous wave application, which means that the laser works constantly and is not pulsed. However, pulsed welding may be used as well. Laser transmission welding is used to form continuous welding lines between resilient layer and plate 20. Before welding, plate 20 is placed with the resilient layer abutting its surface and is held thereto under mechanical pressure.

The laser is then continuously applied through the plate 20, preferably at a rate of between about 1 m and 6 m per minute. However, speeds of up to 10 m per minute may also be used. Plate 20 is minimally affected by the laser because plate 20 is generally transparent to the laser. The energy transmitted by the laser is absorbed by resilient layer 22. A film generally opaque to the laser, such as a polyethylene film, is preferably pre-applied to resilient layer 22 and oriented between plate 20 and resilient layer 22. The laser causes the film to melt to permit adhesion of the film to plate 20. The laser may then moved to form a melt line to attach resilient layer 22 to plate 20. The line is approximately between 3 mm and 5 mm wide. Several lines may be used to form a closed rectangle contour adjacent the perimeter of the resilient layer by making four weld lines. While it might be expected that any protrusions or surface irregularities of plate 20 would interfere with the weld process, this is generally not the case in the procedure described herein. A dye or other material may be added to the film, or even the resilient layer, to make it more or less opaque to the laser thereby affecting the heat transferred by the laser thereto. When applying laser welding, the area welded is preferably greater than that described for ultrasonic welding.

If a film is not used to attach a plate to a resilient, layer, then the above procedure may still be completed. In the absence of a film, a resilient layer having smaller voids or cells (not shown) is preferably used. The voids are preferably of a size that is small enough to provide sufficient foam material to be melted by the laser to adhere to plate 20. The smaller voids can also reduce the diffraction of the laser beam. This limited diffraction helps to concentrate the laser energy so that it melts the resilient layer.

Numerous modifications, variations, and adaptations may be made to the particular embodiments of the invention described above without departing from the scope of the invention, which is defined in the following claims.

What is claimed is:

1. A method for bonding a polyethylene resilient layer to a polypropylene plate, comprising the steps of:
    placing the resilient layer adjacent the plate;
    pressing an ultrasonic welding probe only into the resilient layer until movement of the probe is inhibited by the plate;
    activating the probe;
    holding the probe in place until the resilient layer melts sufficiently to adhere to the plate; and
    withdrawing the probe.

2. The method of claim 1, wherein the probe is held in place for between 0.5 and 2 seconds.

3. The method of claim 2, wherein the probe is held in place for 0.8 seconds.

4. The method of claim 1, wherein the step of pressing the probe into the resilient layer takes 0.5 seconds.

5. The method of claim 1, further comprising the steps of deactivating the probe and waiting for approximately 1 second before the step of withdrawing the probe.

6. The method of claim 1, wherein the probe is pressed into the resilient layer until the movement of the probe is inhibited by the plate.

7. The method of claim 1, wherein the resilient layer is a foam.

8. The method of claim 1, wherein the plate is made from one of polypropylene and polyethylene, and the resilient layer is made from one of polypropylene foam, polyethylene foam.

9. The method of claim 1, wherein the resilient layer is less than 3/8 of an inch thick.

10. A method for bonding a polyethylene resilient layer to a polypropylene plate, comprising the steps of:
    placing the resilient layer adjacent the plate;
    activating an ultrasonic welding probe;
    pressing the activated ultrasonic welding probe only into the resilient layer;
    holding the probe in place until the resilient layer melts sufficiently to adhere to the plate; and
    withdrawing the probe.

11. A method for bonding a resilient layer to a plate, comprising:
    placing a film on a first side of the resilient layer;
    positioning the resilient layer so that the film lies against the plate;
    pressing an ultrasonic welding probe only into the resilient layer until the movement of the probe is inhibited by the plate;
    activating the probe;
    maintaining the probe in position long enough to melt a portion of the resilient layer around the probe to bond the resilient layer to the plate; and
    withdrawing the probe.

12. The method of claim 11, wherein the film is polyethylene and the plate is made from polyethylene or polypropylene.

13. The method of claim 12 wherein the resilient layer is made from one of polypropylene foam, polyethylene foam, polyurethane foam or rubber.

14. The method of claim 13, wherein the resilient layer is less than 3/8 of an inch thick.

15. The method of claim 12, wherein the film is between 0.5 and 8 mils thick.

16. A method for bonding a resilient layer with a first side and an opposite second side to a plate, comprising:
    placing a film on the first side of the resilient layer;
    positioning the resilient layer so the second side of the resilient layer lies against the plate;
    pressing an ultrasonic welding probe only into the film and resilient layer until the movement of the probe is inhibited by the plate to bond the resilient layer to the plate; and
    withdrawing the probe.

17. The method of claim 16, wherein the film is polyethylene and the plate is made from polyethylene or polypropylene.

18. The method of claim 17, wherein the resilient layer is made from one of polypropylene foam, polyethylene foam, polyurethane foam or rubber.

19. The method of claim 17, wherein the resilient layer is less than 3/8 of an inch thick.

20. The method of claim 17, wherein the film is between 0.5 and 8 mils thick.

21. A method for bonding a resilient layer with a first side and an opposite second side to a plate, comprising:
    placing a first film on the first side of the resilient layer;
    placing a second film on the second side of the resilient layer;
    positioning the resilient layer so the first film lies against the plate;
    pressing an ultrasonic welding probe only into the second film, then only into the resilient layer and then into the first film until the movement of the probe is inhibited by the plate to bond the resilient layer to the plate; and
    withdrawing the probe.

22. The method of claim 21, wherein the first film is polyethylene and the plate is made from polyethylene or polypropylene.

23. The method of claim 22, wherein the resilient layer is made from one of polypropylene foam, polyethylene foam, polyurethane foam or rubber.

24. The method of claim 22, wherein the resilient layer is less than 3/8 of an inch thick.

25. The method of claim 22, wherein the first film is between 0.5 and 8 mils thick and the second film is between 0.5 and 8 mils thick.

26. An anchor sheet for use in a modular subfloor, the anchor sheet comprising:
- a polypropylene plate; and
- a polyethylene resilient layer, wherein the resilient layer is ultrasonically welded to the plate by:
- placing the resilient layer adjacent the plate;
- pressing an ultrasonic welding probe only into the resilient layer;
- activating the probe;
- holding the probe in place until the resilient layer melts sufficiently to adhere to the plate; and
- withdrawing the probe.

27. An anchor sheet comprising:
- a sheet with a first and second surface;
- the sheet being made of a polypropylene and having a thickness of between 0.031 inches and 0.75 inches;
- the first surface bearing hooks; and
- a resilient layer ultrasonically welded to the second surface.

* * * * *